Figure 1A:
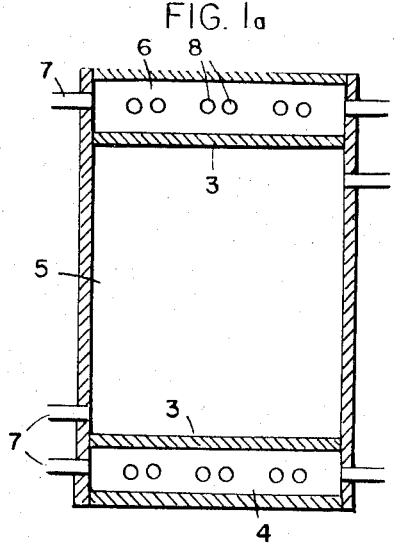

United States Patent [19]

Eisele et al.

[11] 3,775,283

[45] Nov. 27, 1973

[54] ELECTROLYTIC CELL INCLUDING BIPOLAR ELECTRODES HAVING TWO SPACED CHAMBERS IN EACH ELECTRODE FOR FEEDING AND WITHDRAWING ELECTROLYTE FROM THE CELL

[75] Inventors: Wolfgang Eisele; Heinz Nohe; Hans Von Ammon; Fritz Beck; Hubert Suter, all of Ludwigshafen, Germany

[73] Assignee: Badische Anilin- & Soda-Fabrik Aktiengesellschaft, Ludwigshafen/Rhein, Germany

[22] Filed: July 29, 1971

[21] Appl. No.: 167,207

[30] Foreign Application Priority Data
Aug. 8, 1970   Germany.................. P 20 39 590.8

[52] U.S. Cl.................... 204/268, 204/75, 204/255, 204/275, 204/284
[51] Int. Cl............................................. B01k 3/04
[58] Field of Search..................... 204/75, 254, 255, 204/268, 269, 280, 286, 284, 275

[56] References Cited
UNITED STATES PATENTS

| | | | |
|---|---|---|---|
| 1,790,248 | 1/1931 | Roth | 204/268 |
| 3,518,180 | 6/1970 | Grotheer | 204/268 |
| 3,451,906 | 6/1969 | Weed | 204/269 |

Primary Examiner—John H. Mack
Assistant Examiner—W. I. Solomon
Attorney—Johnston, Root, O'Keeffe, Keil, Thompson & Shurtleff

[57] ABSTRACT

Bipolar electrodes having two chambers for inflow and outflow of the reaction mixture to be electrolyzed. The chambers are separated from each other by a distance which is considerably larger than their width and the inlets and outlets are on the same side of the electrode. Electrodes of this kind are suitable, for example, for the Kolbe synthesis of dicarboxylic esters from dicarboxylic half-esters. Such esters are useful as plasticizers.

6 Claims, 5 Drawing Figures

INVENTORS:
WOLFGANG EISELE
HEINZ NOHE
HANS VON AMMON
FRITZ BECK
HUBERT SUTER

ELECTROLYTIC CELL INCLUDING BIPOLAR ELECTRODES HAVING TWO SPACED CHAMBERS IN EACH ELECTRODE FOR FEEDING AND WITHDRAWING ELECTROLYTE FROM THE CELL

This invention relates to bipolar electrodes suitable for effecting electrochemical reactions. Such bipolar electrodes are particularly suitable for electrochemical conversions of organic substances in organic electrolytes of relatively poor conductivity, e.g. they are suitable for carrying out Kolbe reactions.

It is known to convert monocarboxylic acids to alkanes and di-carboxylic acid half-esters to dicarboxylic di-esters having twice the number of methylene groups, by anodic condensation. This process is known as the Kolbe reaction. Where such processes are carried out on a laboratory scale, a wide variety of electrode shapes may be used, the electrolyte being caused, by pumping or stirring, to flow in an electrolysis zone which extends parallel to the surface of the electrodes when the latter are in the form of plates or cylinders. Where gauze-type electrodes are used, the electrolyte flows through an electrolysis zone which extends in a direction perpendicular to the macroscopic surface of the electrode. The electrolyte generally consists of a solution of the acid or half-ester to be converted in a polar organic solvent such as methanol. In order to achieve sufficient electrical conductivity, the acid or half-ester is partially converted to an appropriate salt, and in order to obtain high current densities at low potentials in the electrolysis zone, it is usual to place the anode and cathode relatively close together. In such an arrangement, special measures must be carried out to remove the reaction gases from the electrolysis zone between the anode and cathode. In the case of gauze-type electrodes, which are permeable to liquids, this may be effected by, say, vibration, and in the case of plate-shaped electrodes the desired effect may be achieved by causing the electrolyte to flow rapidly through the electrolysis zone. Conventional electrodes have two drawbacks however: either they are not suitable for effecting the reaction on an industrial scale, or they may be enlarged only with the use of disproportionately large amounts of corrosion-resistant materials such as platinum.

It is an object of the invention to provide a bipolar electrode (or an electrolyte cell containing such bipolar electrodes) suitable for effecting organic electrochemical syntheses on an industrial scale and capable of being manufactured in a corrosion-resistant form with the use of relatively small amounts of expensive noble metals.

These objects and advantages will be better understood from the following detailed description and the accompanying drawings which show diagrammatically embodiments of bipolar electrodes and of a cell with such electrodes.

According to the invention there is provided a bipolar electrode provided with two chambers located within the bipolar electrode, one at each end thereof, each chamber being provided with an opening through which the substance to be electrolysed may flow into or out of an electrolysing zone one boundary of which is a face of the electrode, the said openings being disposed in the said face of the bipolar electrode. Two or more of these bipolar electrodes, advantageously spaced to define one or more electrolysing zone or zones of minimum dimension of from 0.2 to 1.0 mm, form an electrolytic cell.

Figure 1B:
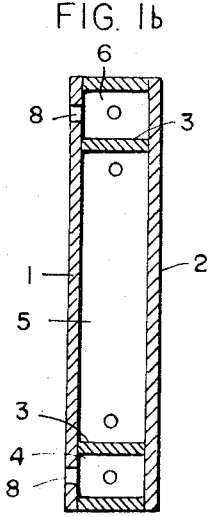

The bipolar electrodes may be constructed, for example, as shown diagrammatically in FIGS. 1a and 1b of the accompanying drawings. The plate electrodes 1 and 2 of conducting material are interconnected by means of webs 3 such that three chambers 4, 5 and 6 are formed, these being sealed from each other. The chambers are provided with side connections 7. The plate electrode 1 is provided with openings (e.g. bores or slots) 8 communicating with the chambers 4 and 6. The plate electrodes 1 and 2 are made of conventional electrode material such as graphite or graphite coated with platinum, steel coated with platinum, platinized titanium, platinized tantalum or similar electrode materials in which the coating of platinum is replaced by platinum alloys, such as platinum/ruthenium, platinum/rhodium, platinum/iridium or platinum/gold, or by gold alone.

Figure 2A:
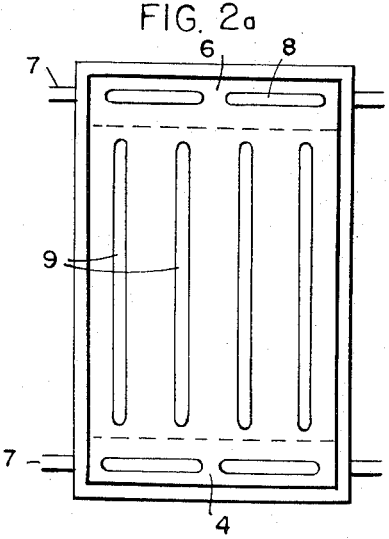
Figure 2B:
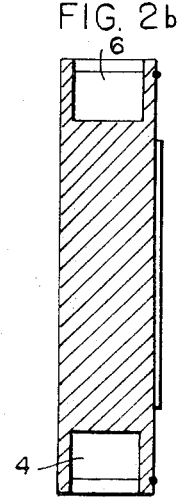

The webs 3 either consist of the same material as the plate electrodes, in which case they are welded thereto, or they are of a plastics materials and are sealingly secured to the plates by an adhesive, applied pressure, screws or other means. The plates 1 and 2 must be electrically interconnected. In the embodiment shown in the diagrams, the chambers 4 and 6, through which the reaction mixture flows, are separated from each other by a chamber 5 which may remain as a cavity or be used as a cooling chamber. A simpler form of electrode is one in which a plate of suitable thickness, i.e. having a thickness of about 1–5 cm, is used, cavities corresponding to the chambers 4 and 6 having been cut in the plate ends from the side and covered by a perforated or slotted plate (to provide the openings 8) providing passages for the reaction mixture. For the accomodation of the spacers necessary for maintaining the small gap required between the electrodes to define the electrolysing zone, grooves 9 are cut in the plate, for example on its cathode side. A bipolar electrode of this kind is illustrated in FIGS. 2a and 2b.

As illustrated in FIGS. 1a, 1b, 2a and 2b the chambers, with their openings for the substance to be electrolysed are situated at opposite ends of the electrode and these chambers extend over substantially the full width of said ends. Narrower chambers could be used but preferably they extend over a major portion of the width of the electrode, for example more than 60 percent thereof. The distance between the chambers is preferably considerably larger, for example from 8 to 100 times larger, than the width of the chambers. The electrodes are usually employed in a vertical or nearly vertical position, in which case the chambers 4 and 6 are disposed in a vertical plane one above the other. When the electrodes are arranged in a horizontal position, the said chambers are disposed in horizontal relationship to each other. When the electrodes are in use, the electrolyte flows in through the chamber at one end of the electrode and then flows in an electrolysing zone across the surface of the electrode to pass out through the other chamber of the electrode. The period of contact between the electrolyte and the electrode may be varied by using electrodes having suitable spacing between the chambers, this usually being from 5 to 150 cm and preferably, in the case of the Kolbe reaction, from 30 to 70 cm, and by varying the rate of flow of the electrolyte through the electrolysing zone. These factors also govern the upper limit of the distance between the two chambers.

The width of the electrode plates may be large in order to provide an adequate effective electrode area. The width may well be a multiple of the height (i.e. the distance between the chambers), for example a multiple of about 2 to 5.

Bipolar electrodes of the kind described above may be assembled to form electrolytic cells in the usual manner, and it is possible to pack the electrodes very close together, i.e. with electrolysing zones of from 0.2 to 1.0 mm thick defined between the electrode plates. Conveniently, the electrolysing zones are sealed off from each other by a suitable thermoplastic or elastomeric material such as silicone rubber, by which means electrolytic cell assemblies similar to filter presses are obtained.

Figure 3:
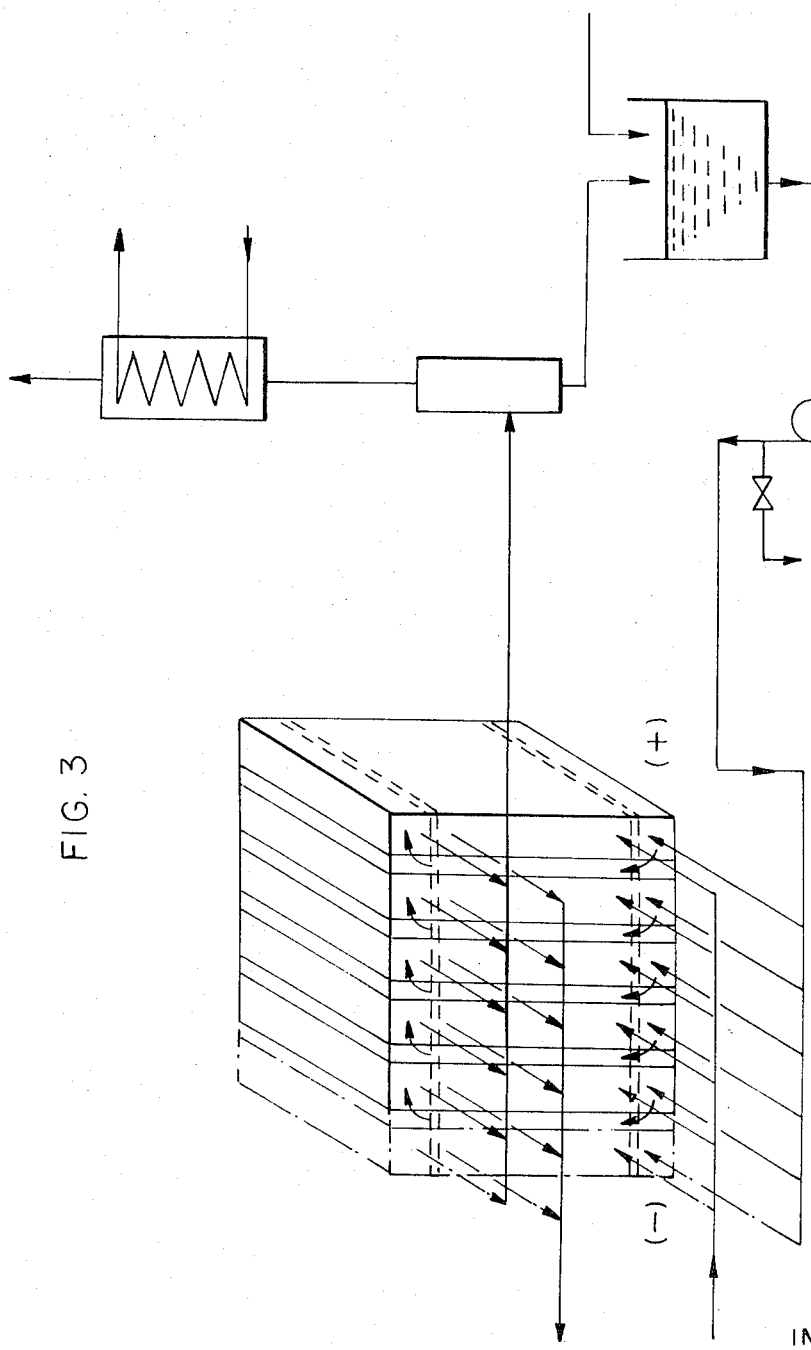

In use, the electrodes in the electrolytic cells are connected in series (see diagram in FIG. 3). The electrolyte or, more generally speaking, the mixture to be electrolyzed passes in through chamber 4, from which it emerges via openings 8 and enters the electrolysing zone between two adjacent bipolar electrodes, and after flowing through this zone it enters the chamber 6 via its openings 8. The electrolyte may be degassed in a separating vessel. Using distributor pipes and electrically non-conducting tubing, the cell chambers may be connected in parallel or in series. It is also possible, of course, to use a series connection of groups of cell chambers connected in parallel within the individual groups.

The chamber 5 may be cooled using water, for example.

The bipolar electrodes and electrolytic cells composed thereof may be used in large-scale operations. They are extremely easy to produce and easy to maintain. They enable high current densities to be achieved at low voltages. High current densities lead to high space-time yields. No difficulties are experienced in the removal of the reaction gases, and the cooling facilities make it possible to maintain a constant reaction temperature over the entire area of the electrode plates.

The new design of the bipolar electrodes makes it possible to use corrosion-resistant materials, but the amount of noble metals used may be considerably reduced, since they are rolled onto a carrier or are adhesively applied thereto, the carrier itself not being contacted by the electrolyte. Suitable materials for the carrier include graphite, steel, titanium and tantalum.

A large number of electrochemical reactions, both anodic and cathodic, may be carried out using the bipolar electrodes or electrolytic cells containing such electrodes. In each case, the current density, the composition of the electrolyte and its conductivity should be selected as appropriate for the reaction concerned. Our new bipolar electrodes or electrolytic cells containing such bipolar electrodes have been used with particular success for the anodic condensation of adipic half-esters to sebacic esters by the Kolbe reaction. The starting material used is usually monomethyl adipate or 2-ethylhexyl adipate.

The use of bipolar electrodes as illustrated in FIGS. 1a and 1b for the above reaction is described in the following examples. The electrodes used are such that they have a free area of 2 dm² apart from the area covered by the sealing means, the said free area having a width of 10 cm and a length of 20 cm as measured in the direction of flow. The chambers 4 and 6 have a cross-section of about 2 × 2 cm. The electrode is made of refined steel, the anode plate being covered by a 50 $\mu$thick platinum foil. For the Kolbe reaction it is advantageous when the chambers used for inflow and outflow of reaction mixture in the bipolar electrode are situated on the cathode side. Current densities of from 15 to 30 amps/dm² are used. The electrode gap (i.e. the thickness of the electrolysing zone) is from 0.2 to 1.0 mm and the rate of flow of electrolyte through said zone is from 10 to 100 cm/s. The temperature is maintained at from 35° to 50°C by means of water flowing through the cooling chamber 5 of the electrode.

EXAMPLE 1

1,000 g of a solution of 400 g of monomethyl adipate and 22 g of 31 percent sodium methoxide in methanol are circulated through the electrolysing zone between two bipolar electrodes of the kind described above at a speed of 20 cm/s, the distance between the electrodes being 0.5 mm. The anode and cathode areas are each 2 dm² and the current density is 25 amps/dm². The electrolyte is maintained at a temperature of from 45° to 55°C. The cell potential between the two electrodes is 15 volts. After an on-stream time of 86 hours, the methanol is evaporated off and the residue is basified, washed with water, dried and fractionally distilled. Dimethyl sebacate is obtained in a yield of 85 percent based on the free monomethyl adipate used. The current efficiency is 65.5 percent.

EXAMPLE 2

1,200 g of a solution of 360 g of mono-2-ethyl adipate and 24 g of a 31 percent methanolic solution of sodium methoxide are circulated through an electrolytic cell of the kind described in Example 1. The current density is 20 amps/dm² and the potential varies from 14 to 18 volts. The reaction mixture is worked up after an on-stream time of 37 hours. The reaction product is purified by blowing out the impurities. Di-2-ethylhexyl sebacate is obtained in a yield of 80 percent, the current efficiency being 61.5 percent.

We claim:

1. A bipolar electrode which comprises: paired and spaced plate electrodes; members joining said plates; said plate electrodes and said members forming spaced chambers located within the bipolar electrode, one at each end thereof, each chamber being provided with openings for passing the substance to be electrolyzed into and out of said chambers, said chambers further including additional openings on the plane of the electrode face through which said substance to be electrolyzed flows to and from said chambers and through an electrolyzing zone, one boundary of said zone being a face of one of said electrodes, said plate electrode having an imperforate face between the areas of said chambers.

2. A bipolar electrode as claimed in claim 1, wherein the said additional openings are provided in the cathode plate of the electrode.

3. A bipolar electrode as set forth in claim 1 wherein the chambers are from 30 to 70 cm apart.

4. A bipolar electrode as set forth in claim 1 wherein the two electrode plates are connected by partitioning members dividing the space between them into a pair of chambers at opposite ends of the plates and a central chamber between the pair of chambers, the central chamber being provided with an inlet and outlet for a heat-exchange medium.

5. An electrolytic cell comprising at least two bipolar electrodes as set forth in claim 1.

6. An electrolytic cell as set forth in claim 5 wherein the gap between adjacent bipolar electrodes is from 0.2 to 1.0 mm wide.

* * * * *